(12) United States Patent
Jung

(10) Patent No.: US 11,331,731 B2
(45) Date of Patent: May 17, 2022

(54) METAL PLATE SHEARING APPARATUS, CONTROL METHOD THEREOF AND METAL PLATE SHEARING METHOD

(71) Applicants: HYUNDAI MOTOR COMPANY, Seoul (KR); KIA MOTORS CORPORATION, Seoul (KR)

(72) Inventor: Youn Il Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 214 days.

(21) Appl. No.: 16/704,187

(22) Filed: Dec. 5, 2019

(65) Prior Publication Data

US 2020/0376573 A1    Dec. 3, 2020

(30) Foreign Application Priority Data

May 27, 2019  (KR) .................. 10-2019-0061713

(51) Int. Cl.
| | |
|---|---|
| *B23D 36/00* | (2006.01) |
| *B23D 15/04* | (2006.01) |
| *B23D 33/02* | (2006.01) |
| *B23D 33/08* | (2006.01) |

(52) U.S. Cl.
CPC ......... *B23D 36/0008* (2013.01); *B23D 15/04* (2013.01); *B23D 33/02* (2013.01); *B23D 33/08* (2013.01)

(58) Field of Classification Search
CPC .... B23D 36/0008; B23D 33/08; B23D 33/02; B23D 15/04; B23D 33/025; B23D 15/08; B26D 7/27; B29C 65/305; B29C 66/81419; B29C 66/80; B29C 66/91212; B31B 70/00; B31B 2155/00; B31B 2160/10
USPC .. 83/13, 16, 19, 39, 171, 175, 18, 649, 386; 156/583.1, 583.4, 515, 510, 250, 251, 156/290, 280, 359, 580, 583, 228, 289; 53/373.7, 373.5, 581.1, 583.4, 515, 547, 53/374.8, 552
See application file for complete search history.

(56) References Cited

U.S. PATENT DOCUMENTS

| | | | | |
|---|---|---|---|---|
| 5,015,223 | A * | 5/1991 | Boeckmann | B29C 65/18 156/581 |
| 5,284,002 | A * | 2/1994 | Fowler | B29C 66/4312 53/412 |
| 5,673,534 | A * | 10/1997 | Fowler | B29C 65/18 493/194 |

(Continued)

FOREIGN PATENT DOCUMENTS

| | | |
|---|---|---|
| JP | 2007-093286 A | 4/2007 |
| KR | 1020200041103 A | 4/2020 |

*Primary Examiner* — Ghassem Alie
(74) *Attorney, Agent, or Firm* — Mintz Levin Cohn Feris Glovsky and Popeo, P.C.; Peter F. Corless

(57) ABSTRACT

A metal plate shearing apparatus, a control method thereof, and a metal plate shearing method are disclosed. The metal plate shearing apparatus includes a lower pad, an upper pad installed on the lower pad to ascend and descend and configured to press and fix an upper surface of a metal plate of a cut target placed on the lower pad, a shear blade installed adjacent to one side surface of the upper pad to ascend and descend and configured to shear a cutting line of the metal plate by descending, and a heating device configured to locally heat the cutting line of the metal plate.

8 Claims, 15 Drawing Sheets

(56) References Cited

U.S. PATENT DOCUMENTS

| | | | | |
|---|---|---|---|---|
| 5,865,015 A | * | 2/1999 | Kume | B29C 65/7451 |
| | | | | 53/552 |
| 6,824,720 B2 | * | 11/2004 | Adachi | B26D 7/27 |
| | | | | 264/157 |
| 2016/0215356 A1 | * | 7/2016 | Yamanaka | C21D 6/00 |

* cited by examiner

[SHEAR ANGLE(Θ): 0°]

| GAP (t) | CROSS SECTION OF SHEAR PORTION | FRONT OF SHEAR PORTION |
|---|---|---|
| 0 ~ 10% |  |  SHEAR REGION / FRACTURE REGION |
| 10 ~ 20% |  |  |
| 20 % OR MORE |  |  |

[SHEAR ANGLE(Θ): 0 ~ 5°]

| GAP (t) | CROSS SECTION OF SHEAR PORTION | FRONT OF SHEAR PORTION |
|---|---|---|
| 0 ~ 5 % |  |  SHEAR REGION / FRACTURE REGION |
| 5 ~ 15% |  |  |
| 15 % OR MORE |  |  |

[SHEAR ANGLE (Θ): 5 ~ 10°]

| GAP (t) | CROSS SECTION OF SHEAR PORTION | FRONT OF SHEAR PORTION |
|---|---|---|
| 0 ~ 5 % |  |  SHEAR REGION / FRACTURE REGION |
| 5 ~ 15% |  |  |
| 15 % OR MORE |  |  |

[SHEAR ANGLE (Θ): 10 ~ 15 °]

| GAP (t) | CROSS SECTION OF SHEAR PORTION | FRONT OF SHEAR PORTION |
|---|---|---|
| 0 ~ 5 % |  |  SHEAR REGION / FRACTURE REGION |
| 5 ~ 15 % |  |  |
| 15 % OR MORE |  |  |

[SHEAR ANGLE(Θ): 15 ~ 20 °]

| GAP (t) | CROSS SECTION OF SHEAR PORTION | FRONT OF SHEAR PORTION |
|---|---|---|
| 0 ~ 10 % |  |  SHEAR REGION / FRACTURE REGION |
| 10 % OR MORE |  |  |

METAL PLATE SHEARING APPARATUS, CONTROL METHOD THEREOF AND METAL PLATE SHEARING METHOD

CROSS-REFERENCE TO RELATED APPLICATION(S)

This application is based on and claims priority under 35 U.S.C. § 119 to Korean Patent Application No. 10-2019-0061713, filed on May 27, 2019, in the Korean Intellectual Property Office, the present disclosure of which is incorporated by reference herein in its entirety.

BACKGROUND

1. Field

The present disclosure relates to a metal plate shearing apparatus, a control method thereof, and a metal plate shearing method capable of minimizing the generation of chips or burrs during a shearing process.

2. Description of Related Art

A metal working process for manufacturing the parts of a vehicle body may include a drawing process of pressing and forming a metal plate, a trimming process of cutting and removing unnecessary portions after the drawing process, a flanging process of making additional shapes, a piercing process of processing holes and the like, and the like. Of these processes, the trimming process is important because it determines the shear surface quality of the finished part.

The disclosure of this section is to provide background of the invention. Applicant notes that this section may contain information available before this application. However, by providing this section, Applicant does not admit that any information contained in this section constitutes prior art.

SUMMARY

It is an aspect of the present disclosure to provide a metal plate shearing apparatus, a control method thereof, and a metal plate shearing method capable of minimizing the generation of chips or burrs during a shearing process.

Additional aspects of the present disclosure will be set forth in part in the description which follows and, in part, will be obvious from the description, or may be learned by practice of the present disclosure.

In accordance with an aspect of the present disclosure, a metal plate shearing apparatus includes a lower pad, an upper pad installed on the lower pad to ascend and descend and configured to press and fix an upper surface of a metal plate of a cut target placed on the lower pad, a shear blade installed adjacent to one side surface of the upper pad to ascend and descend and configured to shear a cutting line of the metal plate by descending, and a heating device configured to locally heat the cutting line of the metal plate.

The heating device may be installed to ascend and descend in a state adjacent to one side surface of the lower pad below the shear blade.

The heating device may include a support block disposed adjacent the one side surface of the lower pad to ascend and descend, an induction heating heater installed on an upper portion of the support block to heat the cutting line of the metal plate, and a heater accommodating portion provided on the upper portion of the support block to accommodate the induction heating heater and having an upper surface open.

The heating device may further include an induction heating shield provided on the inner surface of the heater accommodating portion to block heating of the support block by the induction heating heater.

The induction heating shield may include a non-conductive material coated on the inner surface of the heater accommodating portion.

The heating device may include a plurality of lifting guide rods slidably coupled to the support block in a fixed state to guide ascending and descending of the support block, and a restoring spring installed on the outer surface of each of the plurality of lifting guide rods to impart an ascending restoring force to the support block.

The metal plate shearing apparatus may further include a cooling device configured to cool an upper edge portion of the lower pad, a lower edge portion of the upper pad, and a lower portion of the shear blade, which are adjacent to the cutting line of the metal plate.

The cooling device may include refrigerant pipes provided on the upper edge portion of the lower pad, the lower edge portion of the upper pad, and the lower portion of the shear blade, respectively, and a refrigerant supply unit configured to supply a refrigerant to the refrigerant pipes.

The heating device may be provided on at least one of a lower edge portion of the upper pad and an upper edge portion of the lower pad which are adjacent to the cutting line of the metal plate.

The upper pad or the lower pad may include a heat shield configured to prevent heat from the heating device from diffusing to other areas from the position of the heating device.

In accordance with another aspect of the present disclosure, a control method of a metal plate shearing apparatus includes descending an upper pad to press and fix a metal plate of a shear target when the metal plate is placed on a lower pad, locally heating a cutting line of the metal plate by a heating device when the metal plate is placed on the lower pad, and controlling to shear the cutting line of the metal plate by descending a shear blade after the cutting line of the metal plate is heated.

The heating device may be controlled such that the cutting line of the metal plate is heated to 200~300° C.

The heating by the heating device may begin after the metal plate is placed on the lower pad, and may be terminated before the shear blade shears the cutting line of the metal plate.

During the heating device heats the cutting line of the metal plate, a cooling device may be operated to cool an upper edge portion of the lower pad, a lower edge portion of the upper pad, and a lower portion of the shear blade, which are adjacent to the cutting line of the metal plate.

In accordance with another aspect of the present disclosure, a metal plate shearing method includes fixing a metal plate of a shear target with a lower pad and an upper pad of a shearing apparatus, locally increasing the elongation of a cutting line of the metal plate by heating the cutting line of the metal plate to a set temperature, and shearing the cutting line of the metal plate by descending a shear blade of the shearing apparatus after the cutting line of the metal plate is heated.

A shear region of the cutting line may be formed 50% or more, and a fracture region may be formed toward the inside of the shear line.

The metal plate may be a magnesium plate.

The metal plate may be an aluminum plate.

When a shear angle θ, which is determined by a slope of the metal plate with respect to a line perpendicular to a descending trajectory of the shear blade, is set to 0 degrees, a shear gap t, which is determined by a gap between the shear blade and the upper pad, may be set to 10 to 20% of a thickness of the metal plate.

When a shear angle θ, which is determined by a slope of the metal plate with respect to a line perpendicular to a descending trajectory of the shear blade, is set to 0 to 5 degrees, a shear gap t, which is determined by a gap between the shear blade and the upper pad, may be set to 5 to 15% of a thickness of the metal plate.

When a shear angle θ, which is determined by a slope of the metal plate with respect to a line perpendicular to a descending trajectory of the shear blade, is set to 5 to 10 degrees, a shear gap t, which is determined by a gap between the shear blade and the upper pad, may be set to 5 to 15% of a thickness of the metal plate.

When a shear angle θ, which is determined by a slope of the metal plate with respect to a line perpendicular to a descending trajectory of the shear blade, is set to 10 to 15 degrees, a shear gap t, which is determined by a gap between the shear blade and the upper pad, may be set to 5 to 15% of a thickness of the metal plate.

When a shear angle θ, which is determined by a slope of the metal plate with respect to a line perpendicular to a descending trajectory of the shear blade, is set to 15 to 20 degrees, a shear gap t, which is determined by a gap between the shear blade and the upper pad, may be set to 0 to 10% of a thickness of the metal plate.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The embodiments described below are provided by way of example so that those skilled in the art will be able to fully understand the spirit of the present disclosure. The present disclosure is not limited to the embodiments described below, but may be embodied in other forms. In order to clearly explain the present disclosure, parts not related to the description are omitted from the drawings, and the size of the components may be exaggerated for convenience.

In some implementations of metal working, a shearing apparatus for shearing a metal plate, such as the trimming process, may include a lower pad on which the metal plate is placed, an upper pad to press and fix an upper surface of the metal plate placed on the lower pad, a shear blade or a shearing blade for shearing the fixed metal plate. The metal plate may be sheared or cut by a descending operation of the shear blade after being fixed by the lower pad and the upper pad.

The shear surface of the metal plate may include an upper shear zone that is cut while being plastically deformed by the descending shear blade, and a lower breaking zone that is broken without plastic deformation by the load of the shear blade. In general, an aluminum plate, which is less ductile than a steel plate, has the larger breaking zone than the shear zone due to brittle fracture of the shear surface during shearing.

In the case of a metal plate having relatively lack of ductile such as the aluminum plate, many chips and burrs are generated as the breaking zone increases during the shearing process. As the descending shear blade scrapes off an uneven fracture surface of the breaking zone, many chips are generated, and as the descending shear blade pushes down the uneven fracture surface, many burrs are generated. Chips and burrs generated during the shearing process may cause surface scratches and defects during product handling. For convenience, a shear blade and a blade may be used as the same meaning in the following description.

Figure 1:
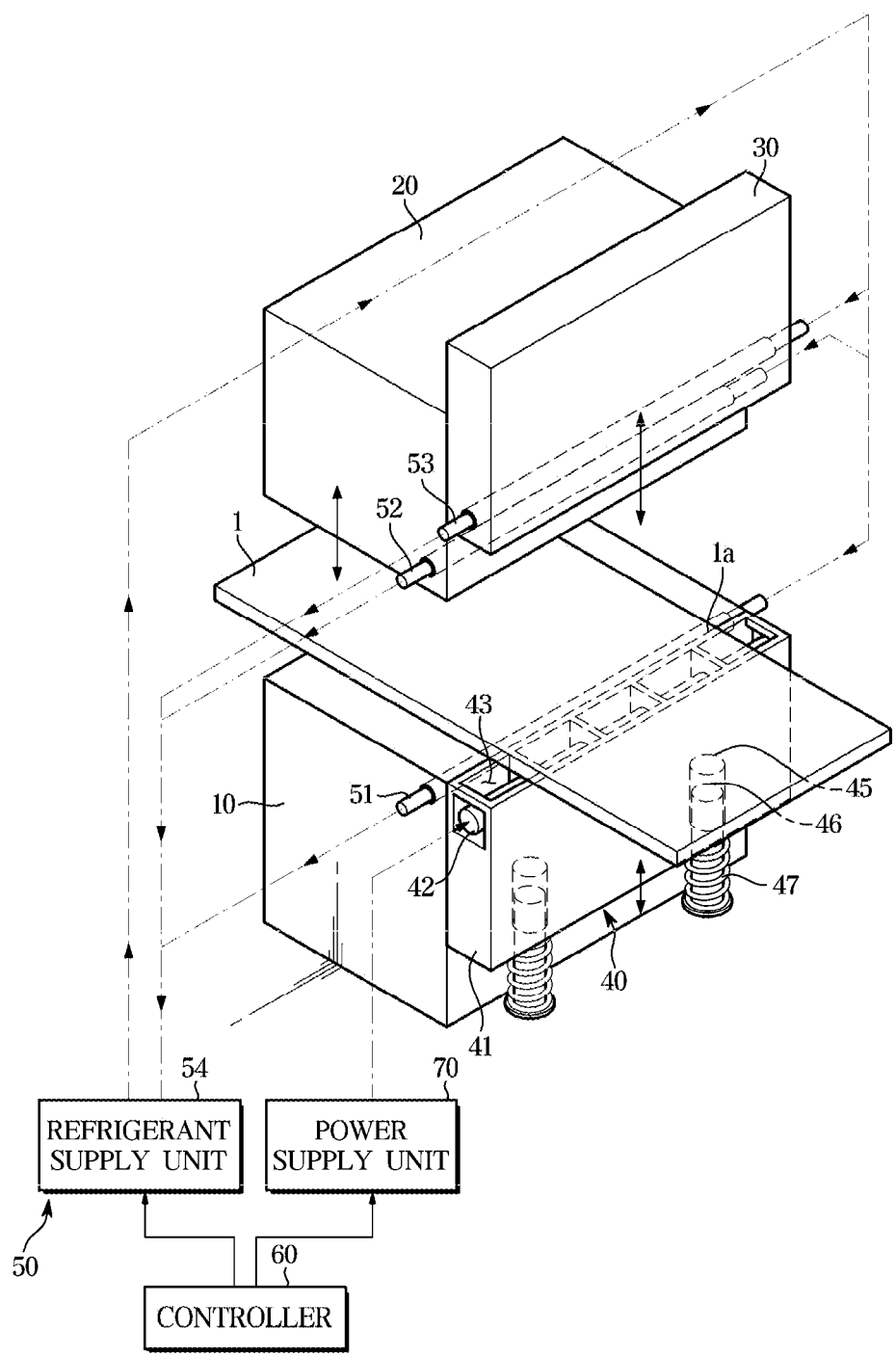
FIG. 1 is a perspective view of a metal plate shearing apparatus according to an embodiment of the present disclosure.

Referring to FIG. 1, a metal plate shearing apparatus according to an embodiment of the present disclosure may include a lower pad 10, an upper pad 20, a shear blade 30, a heating device 40, a cooling device 50, and a controller 60.

The lower pad 10 may include an upper surface on which the metal plate 1 of a shear target is placed, and a lower surface of the lower pad 10 may be fixed to the ground or an installation structure. The upper pad 20 is installed above the lower pad 10 to be able to ascend and descend, and may press an upper surface of the metal plate 1 placed on the lower pad 10 by a descending operation to fix the metal plate 1.

The shear blade 30 is installed to ascend and descend in a state adjacent to one side of the upper pad 20. A cutting line 1a of the metal plate 1 fixed by the lower pad 10 and the upper pad 20 may be sheared or cut by a descending operation of the shear blade or shearing blade 30. In one embodiment, a cutting line is an imaginary line at which a piece of the metal plate is separated from the remaining piece of the metal plate.

The heating device or heater device 40 is installed to ascend and descend in a state adjacent to one side surface of the lower pad 10 below the shear blade or cutting blade 30, and may heat the cutting line 1*a* of the metal plate 1 at a lower side of the metal plate 1 fixed by the lower pad 10 and the upper pad 20. In embodiments, the heater device 40 heats a cutting zone of the metal plate 1 extending along the cutting line 1*a*.

Figure 2:
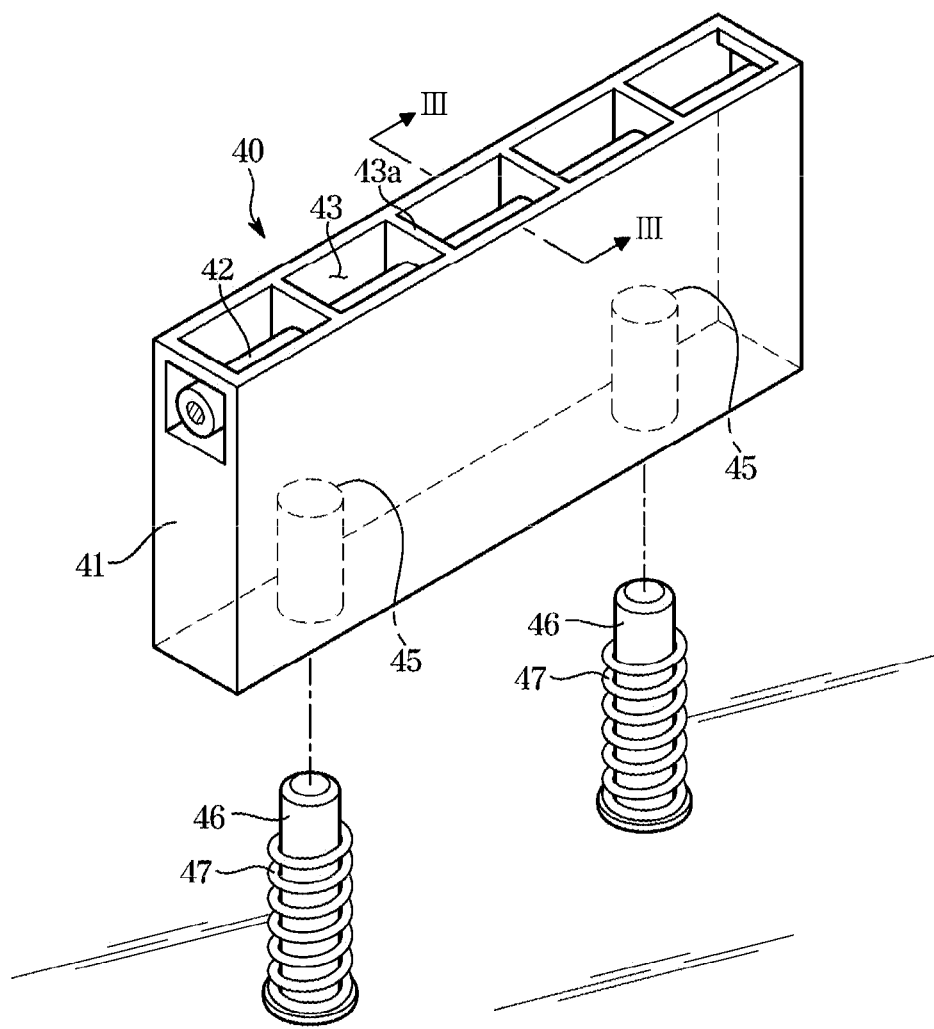
FIG. 2 is a perspective view of a heating device of the metal plate shearing apparatus according to an embodiment of the present disclosure.

Referring to FIGS. 1 and 2, the heating device 40 may include a support block 41 disposed adjacent the one side surface of the lower pad 10 to ascend and descend, an induction heating heater 42 installed on an upper portion of the support block 41 and heating the cutting line 1*a* of the metal plate 1, and a heater accommodating portion 43 provided in a groove shape on the upper portion of the support block 41 to accommodate the induction heating heater 42 and having an upper surface open.

The induction heating heater 42 is positioned adjacent to a lower portion of the cutting line 1*a* of the metal plate 1 and extends longways in a longitudinal direction of the cutting line 1*a* of the metal plate 1 so that only the cutting line 1*a* of the metal plate 1 may be locally heated. The heater accommodating portion 43 of the support block 41 supporting the induction heating heater 42 also extends longways in the direction of the cutting line 1*a* of the metal plate 1.

Figure 3:
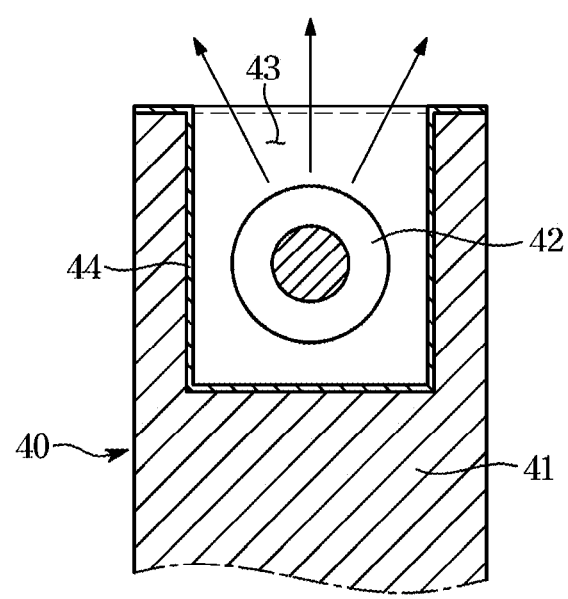
FIG. 3 is a cross-sectional view taken along line III-III' in FIG. 2.

Referring to FIGS. 2 and 3, the heater accommodating portion 43 has a space capable of completely accommodating the induction heating heater 42. The heater accommodating portion 43 may include a plurality of partitions 43*a* provided therein to support the induction heating heater 42. The induction heating heater 42 may maintain a state spaced apart from the inner surface of the heater accommodating portion 43 by being supported by the plurality of partitions 43*a*.

As shown in FIG. 3, the heating device 40 includes an induction heating shield 44 provided on the inner surface of the heater accommodating portion 43 to block heating of the support block 41 by the induction heating heater 42.

The induction heating shield 44 may be provided in such a way that a non-conductive material capable of withstanding at a high temperature of 500° C. or more and capable of shielding the magnetic field is coated on the inner surface of the heater accommodating portion 43. For example, the induction heating shield 44 may be a ceramic coating layer. The induction heating shield 44 increases the heating efficiency of the cutting line 1*a* of the metal plate 1 because the magnetic field of the induction heating heater 42 directs only to the metal plate 1 through the upper opening of the heater accommodating portion 43.

As shown in FIG. 2, the heating device 40 includes a plurality of lifting guide rods 46 slidably coupled to a sliding groove 45 of the support block 41 in a state in which a lower side thereof is fixed to guide ascending and descending of the support block 41, and a restoring spring 47 installed on the outer surface of each of the plurality of lifting guide rods 46 to impart an ascending restoring force to the support block 41.

Figure 4:
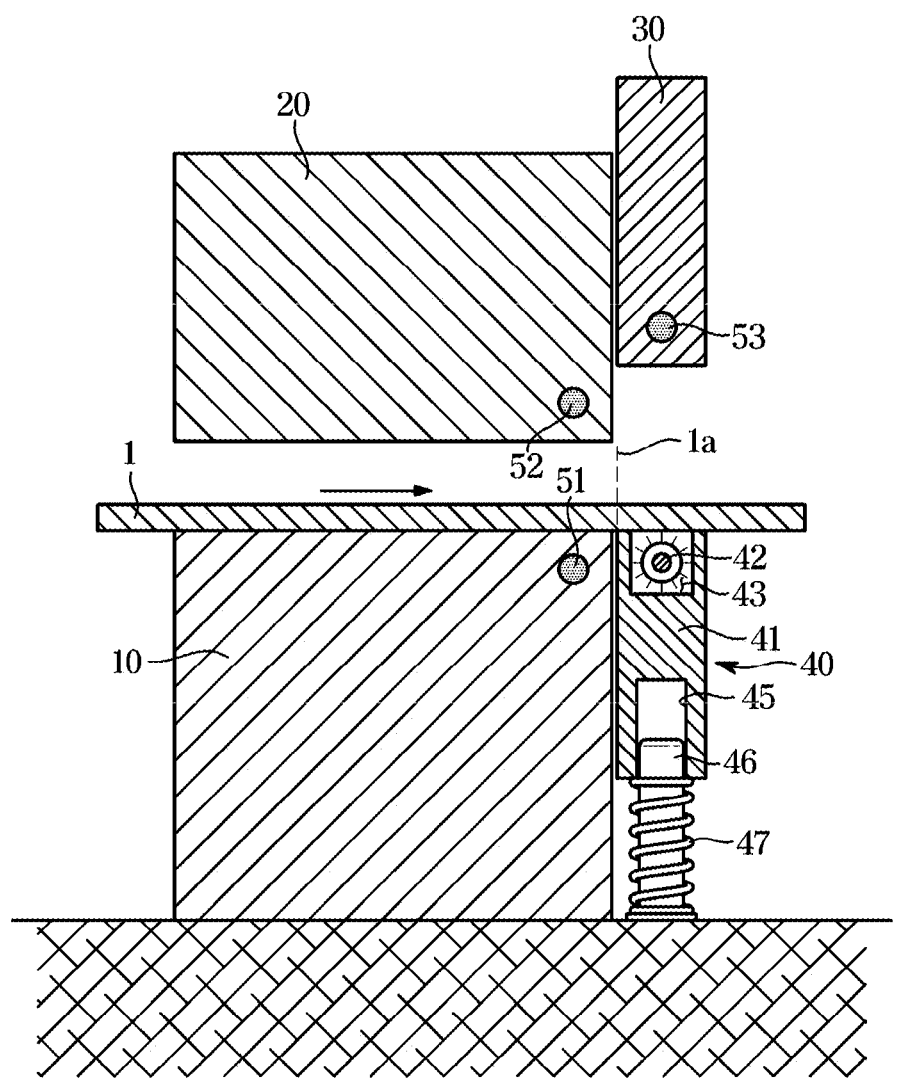
FIGS. 4 to 7 are cross-sectional views illustrating shearing operations of the metal plate shearing apparatus according to an embodiment of the present disclosure step by step.
Figure 7:
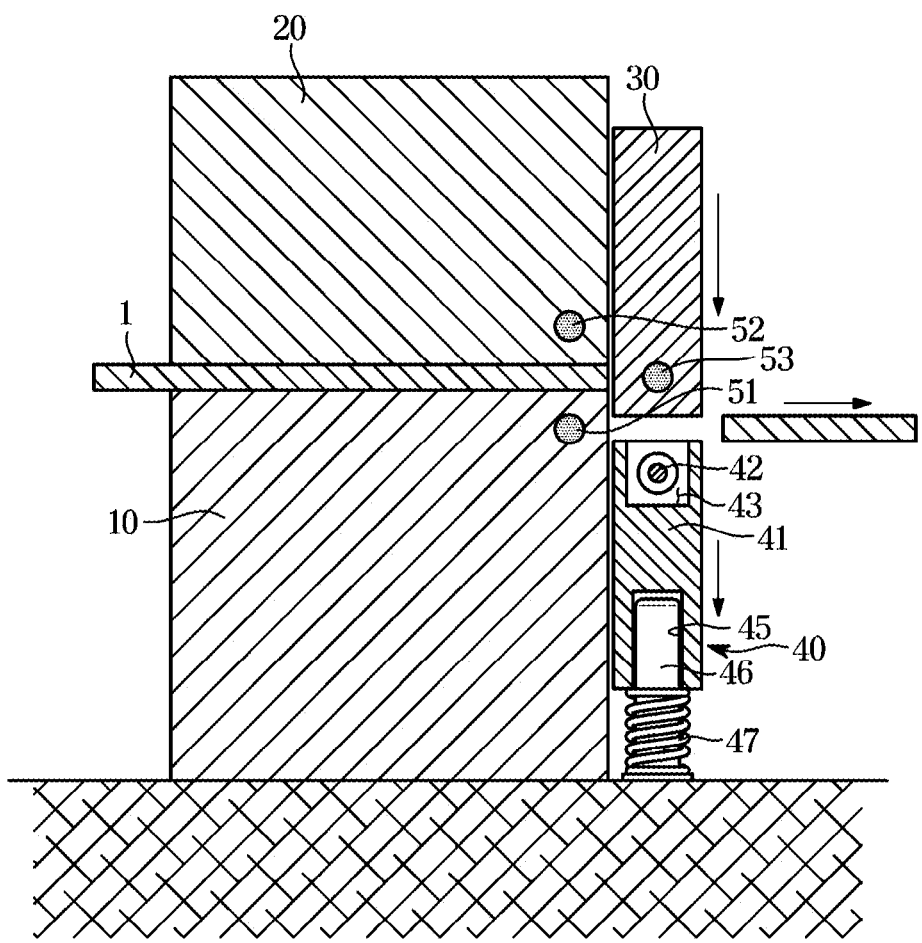

The support block 41 of the heating device 40 maintains the state raised by the extension of the restoring spring 47 as in the example of FIG. 4, or may be pushed down and descends when the shear blade 30 descends for shearing the metal plate 1 as in the example of FIG. 7. When the shear blade 30 rises after shearing the metal plate 1, the support block 41 may ascend again by the extension of the restoring spring 47 so that the induction heating heater 42 is close to the front line 1*a* of the metal plate 1.

In the present embodiment, a method of heating the cutting line 1*a* of the metal plate 1 with the induction heating heater 42 is provided, but the heating method is not limited thereto. In addition to induction heating, the heating method may include radiation heating, laser heating, gas heating, and the like.

Referring to FIG. 1, the cooling device 50 cools an upper edge portion of the lower pad 10, a lower edge portion of the upper pad 20, and a lower portion of the shear blade 30, which are adjacent to the cutting line 1*a* of the metal plate 1, so that the lower pad 10, the upper pad 20, and the shear blade 30 are prevented from being heated by the induction heating heater 42.

The cooling device 50 may include refrigerant pipes 51, 52, and 53 provided on the upper edge portion of the lower pad 10, the lower edge portion of the upper pad 20, and the lower portion of the shear blade 30, respectively, and a refrigerant supply unit 54 for supplying a refrigerant to the refrigerant pipes 51, 52, and 53. The refrigerant supply unit 54 may supply the refrigerant to the refrigerant pipes 51, 52, and 53 provided on the lower pad 10, the upper pad 20, and the shear blade 30, respectively, to cool the lower pad 10, the upper pad 20, and the shear blade 30. In addition, the refrigerant supply unit 54 may recover and cool the refrigerant from each of the refrigerant pipes 51, 52, and 53, and then re-supply the refrigerant to each of the refrigerant pipes 51, 52, and 53.

The controller 60 may control the heating of the induction heating heater 42 by controlling a power supply unit 70 according to a set program and may control the refrigerant supply to each of the refrigerant pipes 51, 52, and 53 by controlling the refrigerant supply unit 54.

The present embodiment illustrates that the cooling device 50 includes the refrigerant pipes 51, 52, and 53 and the refrigerant supply unit 54. The refrigerant supply unit 54 can be configured as a coolant supply compressor. But the form of the cooling device and refrigerant supply unit 54 are not limited thereto. The cooling device 50 may be a method of cooling by spraying air to the upper edge portion of the lower pad 10, the lower edge portion of the upper pad 20, and the lower portion of the shear blade 30, which are adjacent to the cutting line 1*a* of the metal plate 1.

In embodiments, the upper pad 20 and the shear blade 30 may be lifted by separate lifting devices, respectively, and the operation of the lifting devices may be controlled by the controller 60. In addition, the metal plate shearing apparatus of the present embodiment may include a plurality of sensors for sensing a lifting state of the upper pad 20, a plurality of sensors for sensing a lifting state of the shear blade 30, a temperature sensor for sensing a temperature at which the cutting line 1*a* of the metal plate 1 is heated, a plurality of temperature sensors for sensing temperatures of the upper pad 20, the lower pad 10, and the shear blade 30. Sensing information of the sensors is transmitted to the controller 60, and the controller 60 may control the operation of the metal plate shearing apparatus based on this information.

The operation of the metal plate shearing apparatus will be described below with reference to FIGS. 4 to 7.

Referring to FIG. 4, in an initial state, the upper pad 20 and the shear blade 30 are maintained in an ascending state, and the upper end of the support block 41 of the heating device 40 is maintained at the same height as an upper surface of the lower pad 10. In this state, the metal plate 1 for shearing may be placed on the upper surface of the lower pad 10. The metal plate 1 may be an aluminum plate or a magnesium plate. In the description of the present embodiment, the aluminum plate refers to a pure aluminum plate or an aluminum alloy plate, and the magnesium plate also refers to a pure magnesium plate or a magnesium alloy plate.

When the metal plate 1 is placed on the upper surface of the lower pad 10, the controller 60 supplies power to the induction heating heater 42 to locally heat the cutting line 1a of the metal plate 1. When heating of the induction heating heater 42 is performed before the metal plate 1 is placed on the upper surface of the lower pad 10 and stopped, deformation of the metal plate 1 may occur as other portions of the metal plate 1 is heated in the process of moving the metal plate 1. Therefore, in embodiments, the heating of the metal plate 1 is performed after the metal plate 1 is placed on the lower pad 10.

Figure 5:
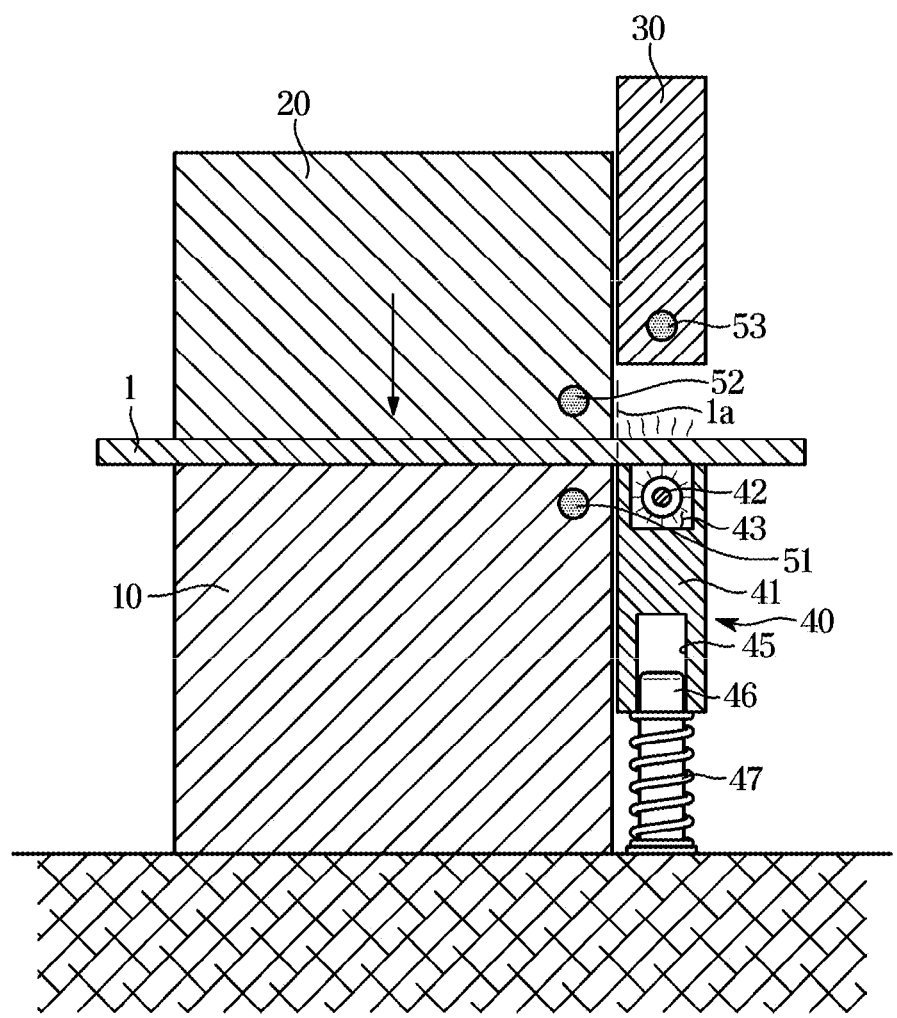
Figure 6:
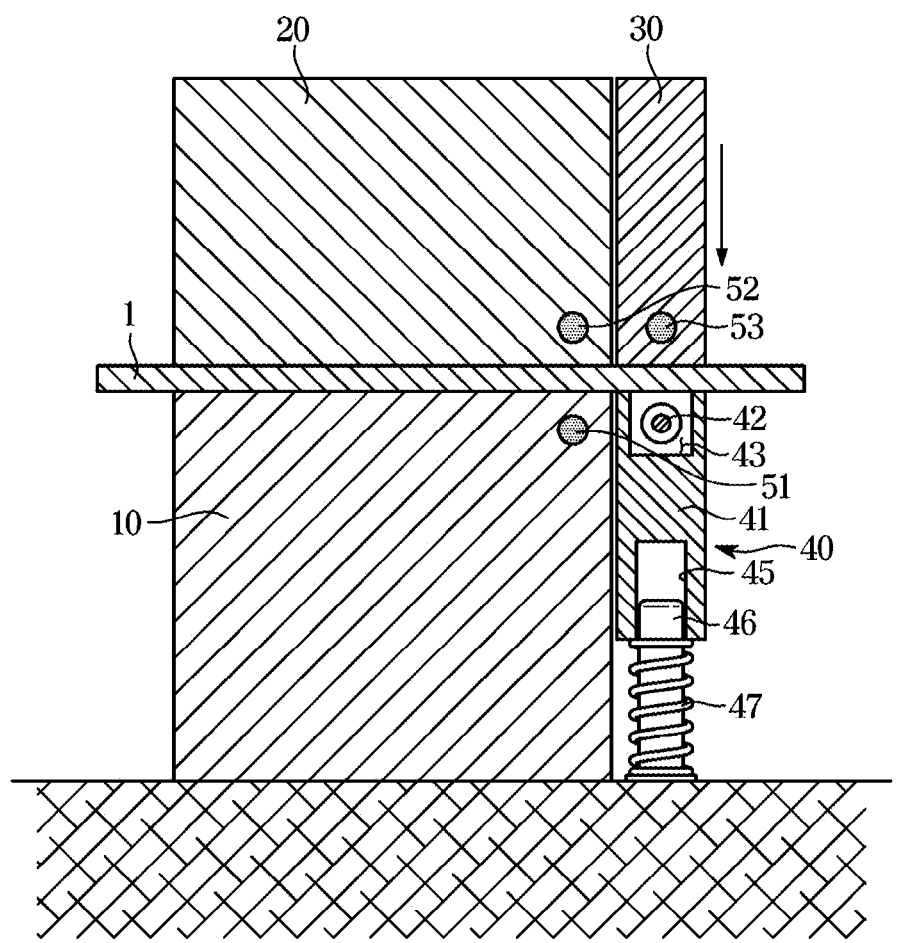

Further, when the metal plate 1 is placed on the upper surface of the lower pad 10, in order to prevent heating of the upper edge portion of the lower pad 10, the lower edge portion of the upper pad 20, and the lower portion of the shear blade 30, which are adjacent to the cutting line 1a of the metal plate 1, the refrigerant supply unit 54 is operated to allow cooling of these portions. As shown in FIG. 5, the controller 60 descends the upper pad 20 to fix the metal plate 1. After the metal plate 1 is fixed, the controller 60 descends the shear blade 30 for the shearing of the cutting line 1a of the metal plate 1, as shown in FIG. 6. At this time, in order to prevent the shear blade 30 from being heated by the induction heating heater 42, the controller 60 may terminate the heating of the induction heating heater 42 immediately before the shear blade 30 reaches the metal plate 1.

When the shear blade 30 further descends in the state of FIG. 6, as shown in FIG. 7, the cutting line 1a of the metal plate 1 is sheared by the shear blade 30, and the support block 1 of the heating device 40 descends by being pushed down by the descending shear blade 30. The support block 41 is buffered by the restoring spring 47 while descending.

After the shearing of the metal plate 1 is completed, as shown in FIG. 4, when the shear blade 30 ascends, the support block 41 ascends by the extension of the restoring spring 47 so that the induction heating heater 42 is close to the cutting line 1a of the metal plate 1.

As such, because the induction heating heater 42 locally heats the cutting line 1a of the metal plate 1 to increase the elongation of the cutting line 1a, the metal plate shearing apparatus according to the present embodiment may minimize the generation of chips or burrs during the shearing process.

Further, because the cooling device 50 cools the upper edge portion of the lower pad 10, the lower edge portion of the upper pad 20, and the lower portion of the shear blade 30, which are adjacent to the cutting line 1a of the metal plate 1, the metal plate shearing apparatus according to the present embodiment may be prevented from being damaged in spite of heating of the induction heating heater 42. In addition, because the heating is limited to the cutting line 1a of the metal plate 1 by the operation of the cooling device 50, thermal deformation of the metal plate 1 (the portion fixed by the lower pad and the upper pad) to be productized after shearing may also be prevented.

Figure 8:
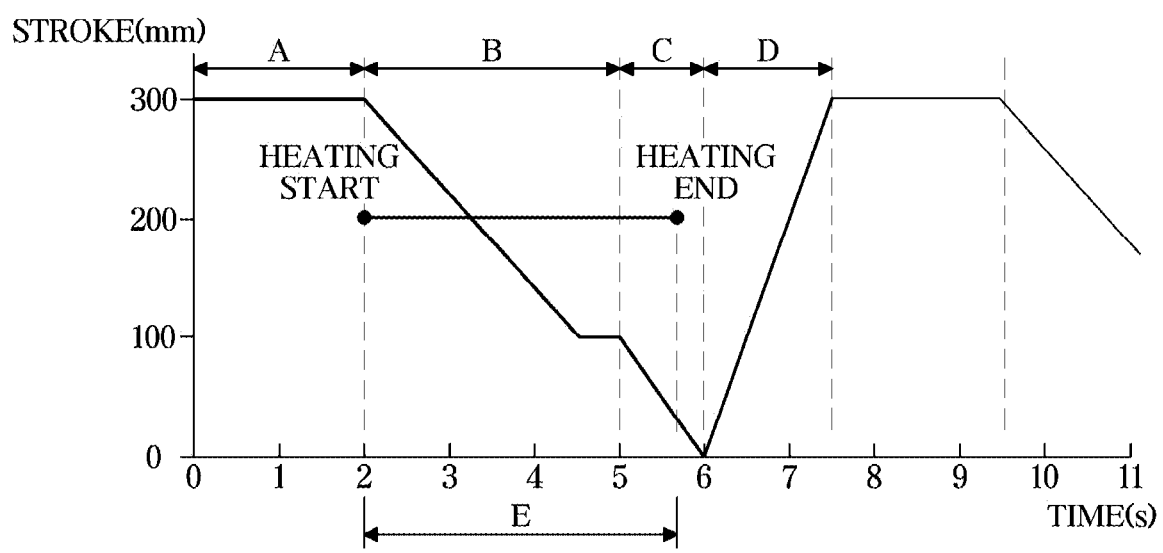
FIG. 8 is an operation timing diagram of the metal plate shearing apparatus according to an embodiment of the present disclosure.

FIG. 8 is a timing diagram for an operation control of the metal plate shearing apparatus as described above. 8 is a timing diagram for an operation control of the metal plate shearing apparatus as described above.

Referring FIG. 8, the operation of the metal plate shearing apparatus over time may be divided into a seating section A in which the metal plate 1 enters and is seated, an upper pad descending section B for fixing the metal plate 1, a shear blade descending section C for shearing of the metal plate 1, an ascending section D in which the upper pad 20 and the shear blade 30 ascend after shearing, and a heating section E in which the induction heating heater 42 heats the cutting line 1a of the metal plate 1.

As shown in FIG. 8, the heating of the cutting line 1a of the metal plate 1 by the induction heating heater 42 may begin after the metal plate 1 is placed on the lower pad 10 and may be terminated before the shear blade 30 shears the cutting line 1a of the metal plate 1. In embodiments, the heating may start at the end of the seating section A and be terminated just before the end of the descending section C.

The cooling device 50 operates not only in the heating section E in which the heating device 40 heats the cutting line 1a of the metal plate 1, but also before and after the heating section E, so that the upper edge portion of the lower pad 10, the lower edge portion of the upper pad 20, and the lower portion of the shear blade 30, which are adjacent to the cutting line 1a of the metal plate 1, may be maintained in a set temperature (cooled state) despite the heating of the induction heating heater 42. As such, when the cooling device 50 is operated, the heating of the metal plate 1 is limited to the cutting line 1a, thereby preventing thermal deformation of the metal plate 1 (the portion fixed by the lower pad and the upper pad) to be productized after shearing.

The temperature at which the induction heating heater 42 heats the metal plate 1 in the heating section E may be set differently depending on the material of the metal plate 1. Table 1 below shows the change in tensile strength and elongation with heating when the metal plate 1 of the shearing target is a 6000 series aluminum plate (A6014-T4, 1.1t) used as a vehicle body material.

TABLE 1

| Temperature (° C.) | Tensile Strength (MPa) | Elongation (%) | Elongation after necking/Elongation |
| --- | --- | --- | --- |
| ~50 | 265 | 31 | 23 |
| 50~100 | 244 | 35 | 40 |
| 100~150 | 220 | 37 | 41 |
| 150~200 | 201 | 39 | 64 |
| 200~250 | 137 | 66 | 89 |
| 250~300 | 89 | 68 | 94 |
| 300~350 | 41 | 60 | 82 |

As shown in Table 1, as the temperature increases from room temperature to 300 20 C. during tension, the 6000 series aluminum plate tends to decrease in strength, increase in elongation, and increase in a local strain (elongation after necking/elongation) ratio among plastic deformation sections. However, when the temperature increases above 300 ° C., the 6000 series aluminum plate tends to decrease in strength and elongation simultaneously, and also tends to decrease in local strain (elongation after necking/elongation) ratio among the most important plastic strain sections. As a result, in embodiments, in order to decrease chips and burrs by preventing brittle fracture and maximizing ductile fracture in the process of shearing the aluminum plate, it may be required to increase the temperature at the cutting line to 200~300 ° C. where the elongation and the local strain (elongation after necking/elongation) ratio among the plastic deformation sections increase rapidly.

When the metal plate 1 of the shearing target is a 5000 series or 6000 series aluminum plate used as the material of the vehicle body, the induction heating heater 42 may reduce the generation of chips or burrs in the shearing process by heating the cutting line 1a to 200~300 ° C. in the heating section E in FIG. 8. Because it takes about 3 seconds to heat the 5000 series or 6000 series aluminum plate to 200~300° C., as shown in FIG. 8, in embodiments, the heating section E is set to 3 seconds or more.

Figure 9:
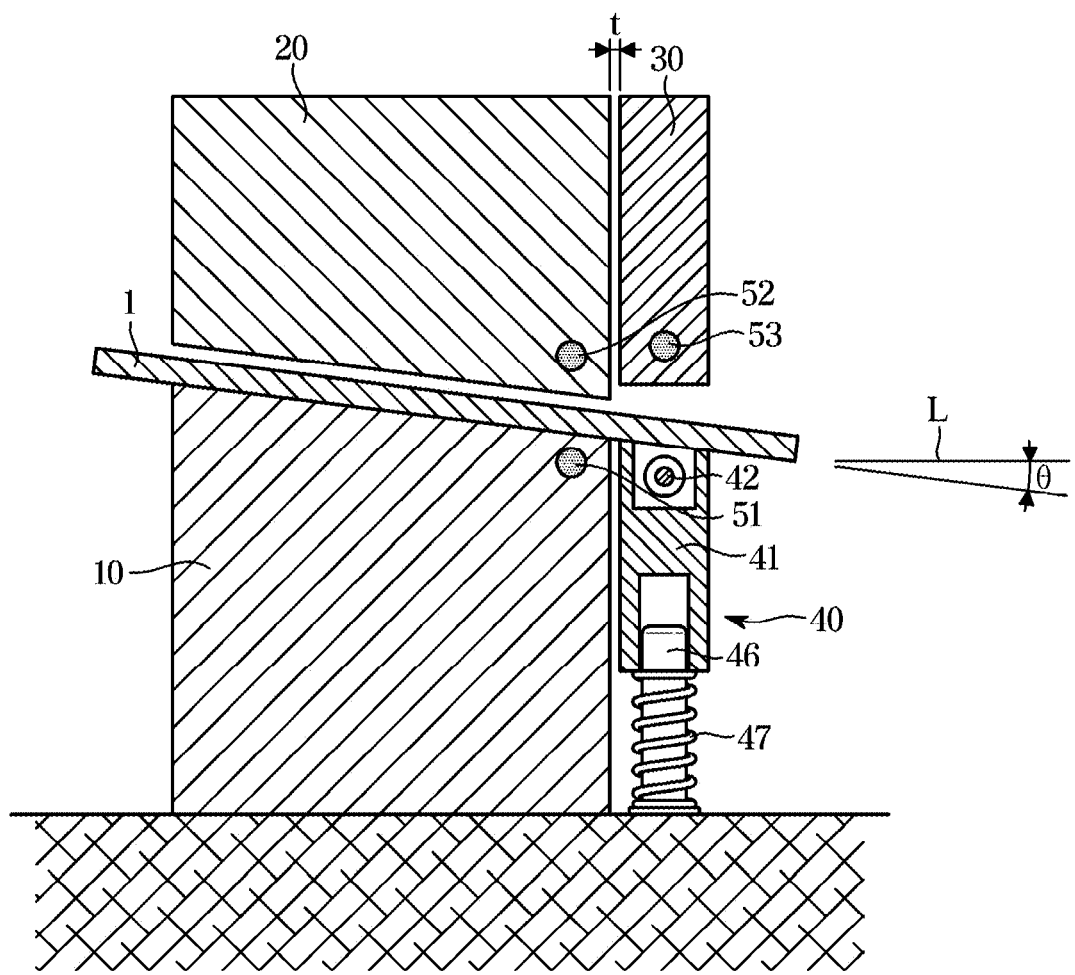
FIG. 9 is a view illustrating a state in which a shear angle and a shear gap of the metal plate shearing apparatus according to an embodiment of the present disclosure are adjusted.

FIG. 9 is a view illustrating a state in which a shear angle and a shear gap of the metal plate shearing apparatus according to an embodiment of the present disclosure are adjusted. The metal plate shearing apparatus according to an embodiment of the present disclosure may reduce the generation of chips or burrs by locally adjusting a shear angle θ and a shear gap tin addition to locally heating the cutting line 1a of the metal plate 1. The shear angle θ is a slope of the metal plate 1 with respect to a line L perpendicular to a descending trajectory of the shear blade 30, and the shear gap t is a gap between one side surface of the shear blade 30 and one side surface of the upper pad 20. The shear angle θ may be set in a manner of adjusting the slope of the upper surface of the lower pad 10 to which the metal plate 1 is fixed and the lower surface of the upper pad 20, and the shear gap t may be set in a manner of adjusting the gap between the one side surface of the upper pad 20 and the one side surface of the shear blade 30.

FIGS. 10 to 14 are views for confirming the shear state of the metal plate while changing the shear angle and the shear gap, and show cross-sectional photographs and front photographs of shear portions, respectively.

Figure 10:
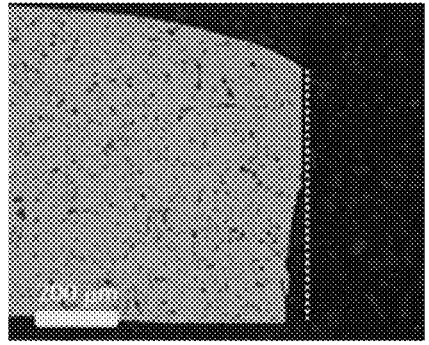
FIGS. 10 to 14 illustrate a shear state of a metal plate according to the change in the shear angle and the shear gap of the metal plate shearing apparatus according to an embodiment of the present disclosure.
Figure 10:
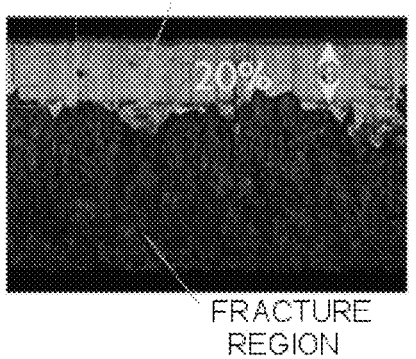
Figure 10:
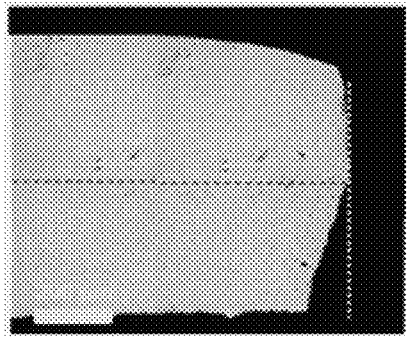
Figure 10:
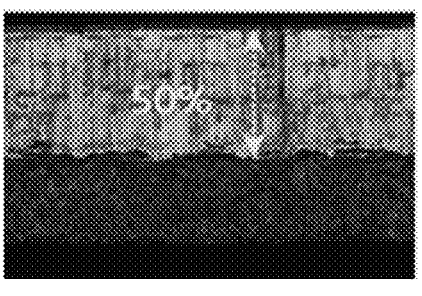
Figure 10:
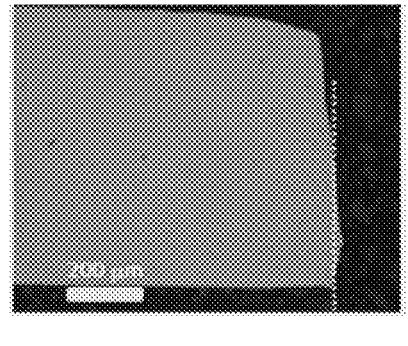
Figure 10:
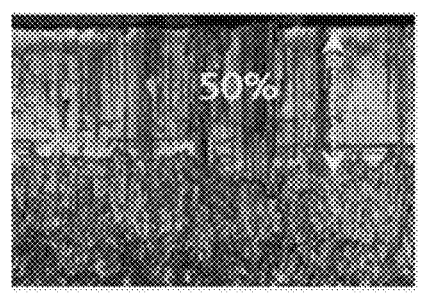

FIG. 10 shows shear states of the metal plate 1 according to the change of the shear gap t at the shear blade angle θ of 0 degrees. As shown in FIG. 10, when the shear gap t is 0 to 10% of a thickness of the metal plate 1 at the shear angle θ of 0 degrees, a shear region of the shear surface is approximately 20% and a fracture region is approximately 80%. In this case, because the fracture region is formed toward the inside of the cutting line 1a and thus is not interfered by the shear blade 30, no burr is generated, but the fracture region is very large and thus many chips are generated.

When the shear gap t is 10 to 20% of the thickness of the metal plate 1 at the shear angle θ of 0 degrees, the shear region is approximately 50% and the fracture region is approximately 50%. In this case, because the fracture region is formed toward the inside of the cutting line 1a and thus is not interfered by the shear blade 30, no burr is generated, and the fracture region is also relatively small and thus the generation of chips may be minimized.

When the shear gap t is 20% or more of the thickness of the metal plate 1 at the shear angle θ of 0 degrees, the shear region is approximately 50% and the fracture region is approximately 50%. However, in this case, because the fracture region is formed toward the outside of the cutting line 1a and thus is interfered by the shear blade 30, many chips and burrs are generated.

In embodiments, the form of the shear surface for reducing the generation of chips and burrs is preferably provided such that the shear region is formed at 50% or more and the fracture region is formed toward the inside of the shear line. Accordingly, in embodiments, when the shear angle θ is set to 0 degrees, in order to reduce the generation of chips and burrs during shearing, it is preferable to set the shear gap t to 10 to 20% of the thickness of the metal plate 1.

Figure 11:
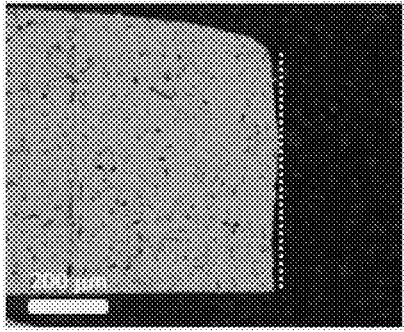
Figure 11:
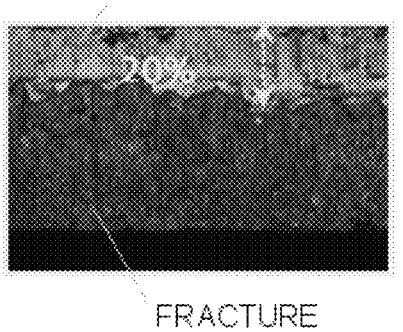
Figure 11:
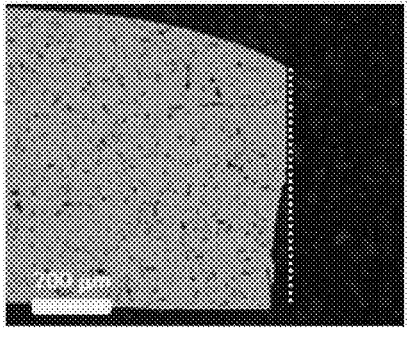
Figure 11:
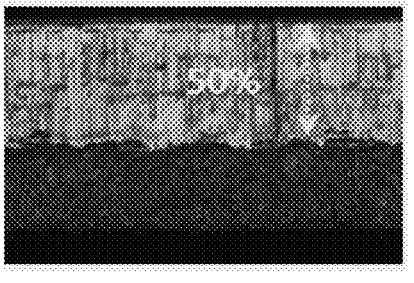
Figure 11:
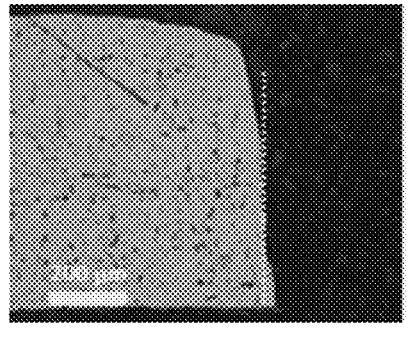
Figure 11:
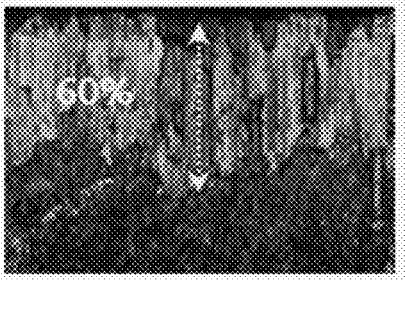

FIG. 11 shows shear states of the metal plate 1 according to the change of the shear gap t at the shear angle θ of 0 to 5 degrees. As shown in FIG. 11, when the shear gap t is 0 to 5% of the thickness of the metal plate 1 at the shear angle θ of 0 to 5 degrees, the shear region of the shear surface is approximately 20% and the fracture region is approximately 80%. In this case, because the fracture region is formed toward the inside of the cutting line 1a and thus is not interfered by the shear blade 30, no burr is generated, but the fracture region is very large and thus many chips are generated.

When the shear gap t is 5 to 15% of the thickness of the metal plate 1 at the shear angle θ of 0 to 5 degrees, the shear region is approximately 50% and the fracture region is approximately 50%. In this case, because the fracture region is formed toward the inside of the cutting line 1a and thus is not interfered by the shear blade 30, no burr is generated, and the fracture region is also relatively small and thus the generation of chips may be minimized.

When the shear gap t is 15% or more of the thickness of the metal plate 1 at the shear angle θ of 0 to 5 degrees, the shear region is approximately 60% and the fracture region is approximately 40%. However, in this case, because the fracture region is formed toward the outside of the cutting line 1a and thus is interfered by the shear blade 30, many chips and burrs are generated.

Accordingly, in embodiments, when the shear angle θ is set to 0 to 5 degrees, in order to reduce the generation of chips and burrs during shearing, it is preferable to set the shear gap t to 5 to 15% of the thickness of the metal plate 1.

Figure 12:
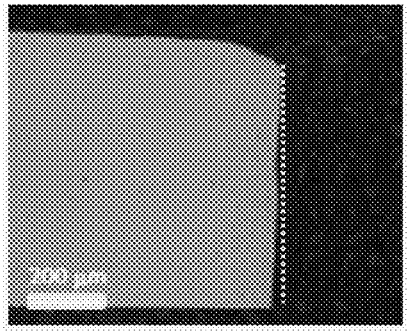
Figure 12:
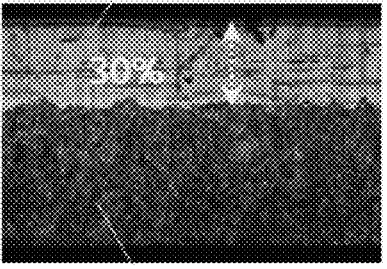
Figure 12:
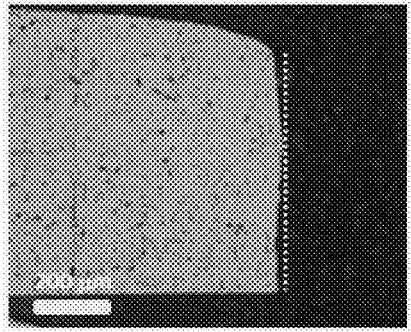
Figure 12:
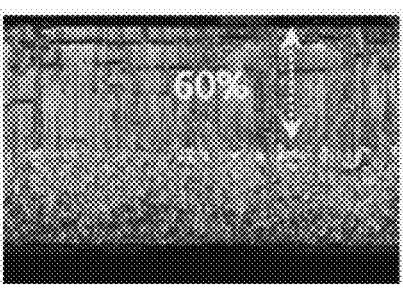
Figure 12:
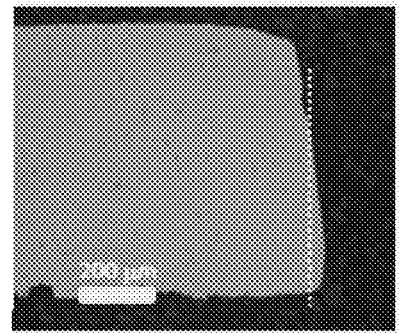
Figure 12:
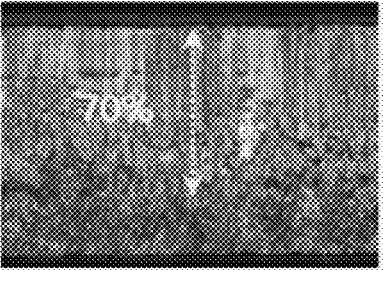

FIG. 12 shows shear states of the metal plate 1 according to the change of the shear gap t at the shear angle θ of 5 to 10 degrees. As shown in FIG. 12, when the shear gap t is 0 to 5% of the thickness of the metal plate 1 at the shear angle θ of 5 to 10 degrees, the shear region of the shear surface is approximately 30% and the fracture region is approximately 70%. In this case, because the fracture region is formed toward the inside of the cutting line 1a and thus is not interfered by the shear blade 30, no burr is generated, but the fracture region is very large and thus many chips are generated.

When the shear gap t is 5 to 15% of the thickness of the metal plate 1 at the shear angle θ of 5 to 10 degrees, the shear region is approximately 60% and the fracture region is approximately 40%. In this case, because the fracture region is formed toward the inside of the cutting line 1a and thus is not interfered by the shear blade 30, no burr is generated, and the fracture region is also relatively small and thus the generation of chips may be minimized.

When the shear gap t is 15% or more of the thickness of the metal plate 1 at the shear angle θ of 5 to 10 degrees, the shear region is approximately 70% and the fracture region is approximately 30%. However, in this case, because the fracture region is formed toward the outside of the cutting line 1a and thus is interfered by the shear blade 30, many chips and burrs are generated.

Accordingly, in embodiments, when the shear angle θ is set to 5 to 10 degrees, in order to reduce the generation of chips and burrs during shearing, it is preferable to set the shear gap t to 5 to 15% of the thickness of the metal plate 1.

Figure 13:
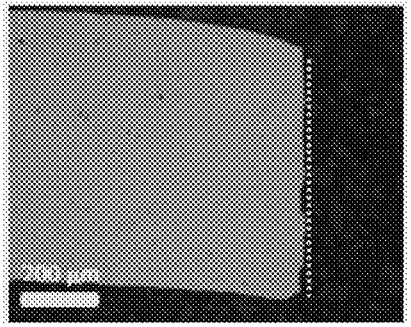
Figure 13:
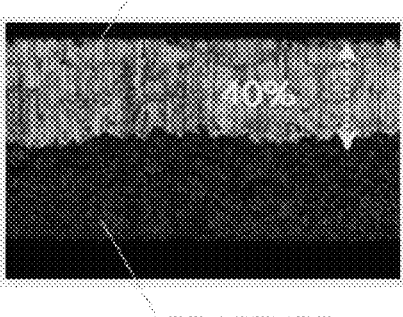
Figure 13:
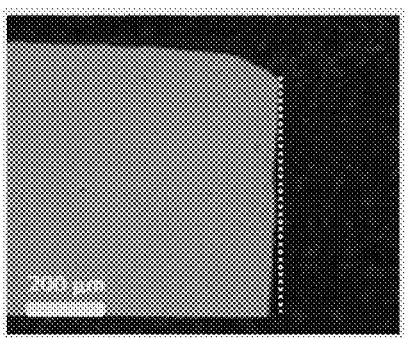
Figure 13:
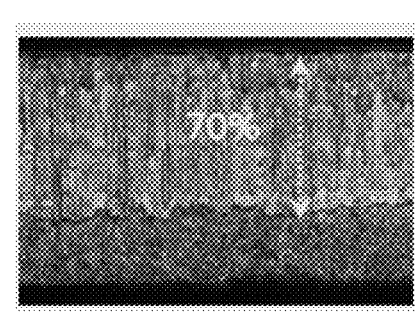
Figure 13:
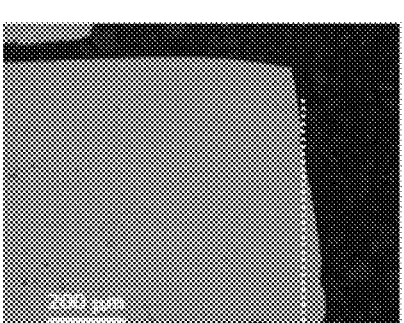
Figure 13:
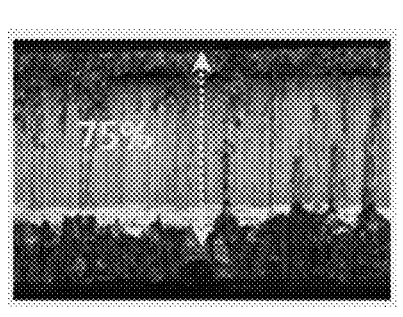

FIG. 13 shows shear states of the metal plate 1 according to the change of the shear gap t at the shear angle θ of 10 to 15 degrees. As shown in FIG. 13, when the shear gap t is 0 to 5% of the thickness of the metal plate 1 at the shear angle θ of 10 to 15 degrees, the shear region of the shear surface is approximately 40% and the fracture region is approximately 60%. In this case, because the fracture region is formed toward the inside of the cutting line 1a and thus is not interfered by the shear blade 30, no burr is generated, but the fracture region is very large and thus many chips are generated.

When the shear gap t is 5 to 15% of the thickness of the metal plate 1 at the shear angle θ of 10 to 15 degrees, the shear region is approximately 70% and the fracture region is approximately 30%. In this case, because the fracture region is formed toward the inside of the cutting line 1a and thus is not interfered by the shear blade 30, no burr is generated, and the fracture region is also relatively small and thus the generation of chips may be minimized.

When the shear gap t is 15% or more of the thickness of the metal plate 1 at the shear angle θ of 10 to 15 degrees, the shear region is approximately 75% and the fracture region is approximately 25%. However, in this case, because the fracture region is formed toward the outside of the cutting line 1a and thus is interfered by the shear blade 30, many chips and burrs are generated.

Accordingly, in embodiments, when the shear angle θ is set to 10 to 15 degrees, in order to reduce the generation of chips and burrs during shearing, it is preferable to set the shear gap t to 5 to 15% of the thickness of the metal plate 1.

Figure 14:
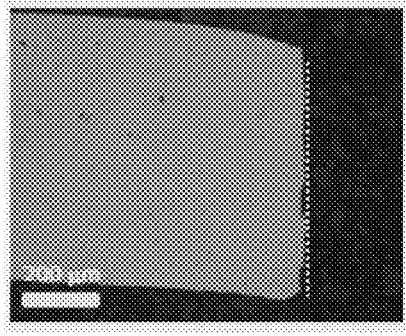
Figure 14:
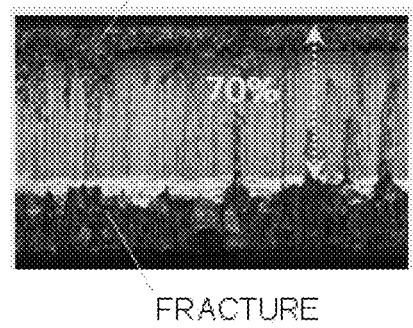
Figure 14:
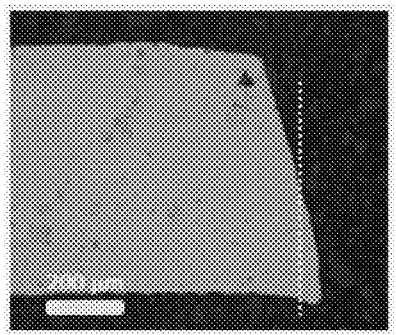
Figure 14:
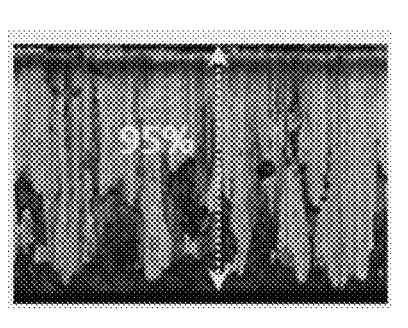

FIG. 14 shows shear states of the metal plate 1 according to the change of the shear gap t at the shear angle θ of 15 to 20 degrees. As shown in FIG. 14, when the shear gap t is 0 to 10% of the thickness of the metal plate 1 at the shear angle θ of 15 to 20 degrees, the shear region of the shear surface is approximately 70% and the fracture region is approximately 30%. In this case, because the fracture region is formed toward the inside of the cutting line 1a and thus is not interfered by the shear blade 30, no burr is generated, and the fracture region is also relatively small and thus the generation of chips may be minimized.

When the shear gap t is 10% or more of the thickness of the metal plate 1 at the shear angle θ of 15 to 20 degrees, the shear region is approximately 95% and the fracture region is approximately 5%. However, in this case, because the fracture region is formed toward the outside of the cutting line 1a and thus is interfered by the shear blade 30, many chips and burrs are generated.

Accordingly, in embodiments, when the shear angle θ is set to 15 to 20 degrees, in order to reduce the generation of chips and burrs during shearing, it is preferable to set the shear gap t to 0 to 10% of the thickness of the metal plate 1.

Figure 15:
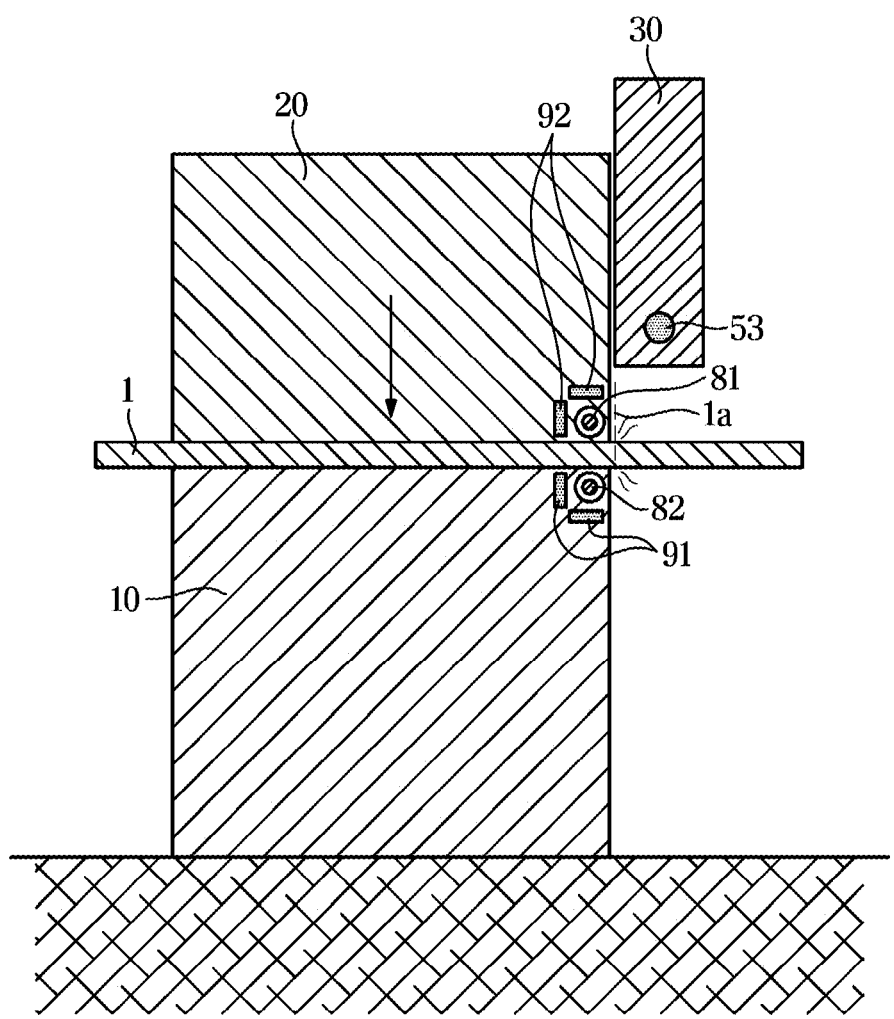
FIG. 15 illustrates an example in which the installation positions of heating devices of the metal plate shearing apparatus according to an embodiment of the present disclosure are changed.

FIG. 15 illustrates an example in which the installation positions of heating devices of the metal plate shearing apparatus according to an embodiment of the present disclosure are changed. As in the example of FIG. 15, heating devices 81 and 82 for locally heating the cutting line 1a of the metal plate 1 are provided at the lower edge portion of the upper pad 20 and the upper edge portion of the lower pad 10, which are adjacent to the cutting line 1a of the metal plate 1.

Although FIG. 15 illustrates a case in which the heating devices 81 and 82 are provided at both the lower edge portion of the upper pad 20 and the upper edge portion of the lower pad 10, the heating device may be provided only at one of the lower edge portion of the upper pad 20 and the upper edge portion of the lower pad 10. Induction heating, radiant heating, laser heating, gas heating and the like may be used as the heating method of the heating devices 81 and 82.

As in the example of FIG. 15, when the heating devices 81 and 82 are provided at the upper pad 20 and the lower pad 10, the upper pad 20 and the lower pad 10 may be provided with heat shields 91 and 92 for preventing heat from the heating devices 81 and 82 from diffusing to other areas of the upper pad 20 and the lower pad 10 from the positions of the heating devices 81 and 82. The heat shields 91 and 92 may be insulating materials that are embedded in the upper pad 20 and the lower pad 10 to block heat transfer or refrigerant pipes provided in the upper pad 20 and the lower pad 10 so that a coolant flows therethrough.

The heat shields 91 and 92 may prevent thermal deformation of the metal plate 1 (the portion fixed by the lower pad and the upper pad) to be productized by allowing the heating by the heating devices 81 and 82 to be limited to the cutting line 1a side of the metal plate 1.

As is apparent from the above, a metal plate shearing apparatus according to an embodiment of the present disclosure can minimize the generation of chips or burrs during a shearing process because a heating device locally heats a cutting line of a metal plate to increase the elongation of the shear line.

The metal plate shearing apparatus according to an embodiment of the present disclosure can be prevented from being damaged in spite of heating of the heating device because a cooling device cools an upper edge portion of a lower pad, a lower edge portion of an upper pad, and a lower portion of a shear blade, which are adjacent to the cutting line of the metal plate.

The metal plate shearing apparatus according to an embodiment of the present disclosure can prevent thermal deformation of the metal plate (the portion fixed by the lower pad and the upper pad) to be productized after shearing because the heating by the heating device is limited to the cutting line of the metal plate and a periphery of the cutting line is cooled by the cooling device.

What is claimed is:

1. A metal plate shearing apparatus comprising:
a lower pad;
an upper pad installed on the lower pad to ascend and descend and configured to press and fix an upper surface of a metal plate placed on the lower pad;
a blade installed adjacent to one side surface of the upper pad to ascend and descend and configured to shear the metal plate at a cutting line by descending; and
a heater device configured to locally heat the cutting line of the metal plate, and
wherein the heater device is installed to ascend and descend in a state adjacent to one side surface of the lower pad below the blade, and
wherein the heater device includes;
a support block disposed adjacent the one side surface of the lower pad to ascend and descend;
an induction heating heater installed on an upper portion of the support block to heat the cutting line of the metal plate; and
a heater accommodating portion provided in a groove shape on the upper portion of the support block to accommodate the induction heating heater and having an upper surface of the groove open.

2. The metal plate shearing apparatus according to claim wherein the heater device further includes an induction heating shield provided on the inner surface of the heater accommodating portion to block heating of the support block by the induction heating heater.

3. The metal plate shearing apparatus according to claim 2, wherein the induction heating shield includes a non-conductive material coated on the inner surface of the heater accommodating portion.

4. The metal plate shearing apparatus according to claim 1, wherein
the heater device includes:
a plurality of lifting guide rods slidably coupled to the support block in a fixed state to guide ascending and descending of the support block; and
a restoring spring installed on the outer surface of each of the plurality of lifting guide rods to impart an ascending restoring force to the support block.

5. The metal plate shearing apparatus according to claim further comprising a cooling device configured to cool an upper edge portion of the lower pad, a lower edge portion of the upper pad, and a lower portion of the blade, which are adjacent to the cutting line of the metal plate.

6. The metal plate shearing apparatus according to claim 5, wherein the cooling device includes:
refrigerant pipes provided on the upper edge portion of the lower pad, the lower edge portion of the upper pad, and the lower portion of the blade, respectively; and
a supply compressor configured to supply a refrigerant to the refrigerant pipes.

7. The metal plate shearing apparatus according to claim 1, wherein the heater device is provided on at least one of a lower edge portion of the upper pad and an upper edge portion of the lower pad which are adjacent to the cutting line of the metal plate.

8. The metal plate shearing apparatus according to claim 7, wherein the upper pad or the lower pad includes a heat shield configured to prevent heat from the heater device from diffusing to other areas from the position of the heater device.

* * * * *